J. DAIN.
HAY RETAINING DEVICE FOR HAY STACKERS.
APPLICATION FILED MAR. 21, 1907.
949,352.
Patented Feb. 15, 1910.
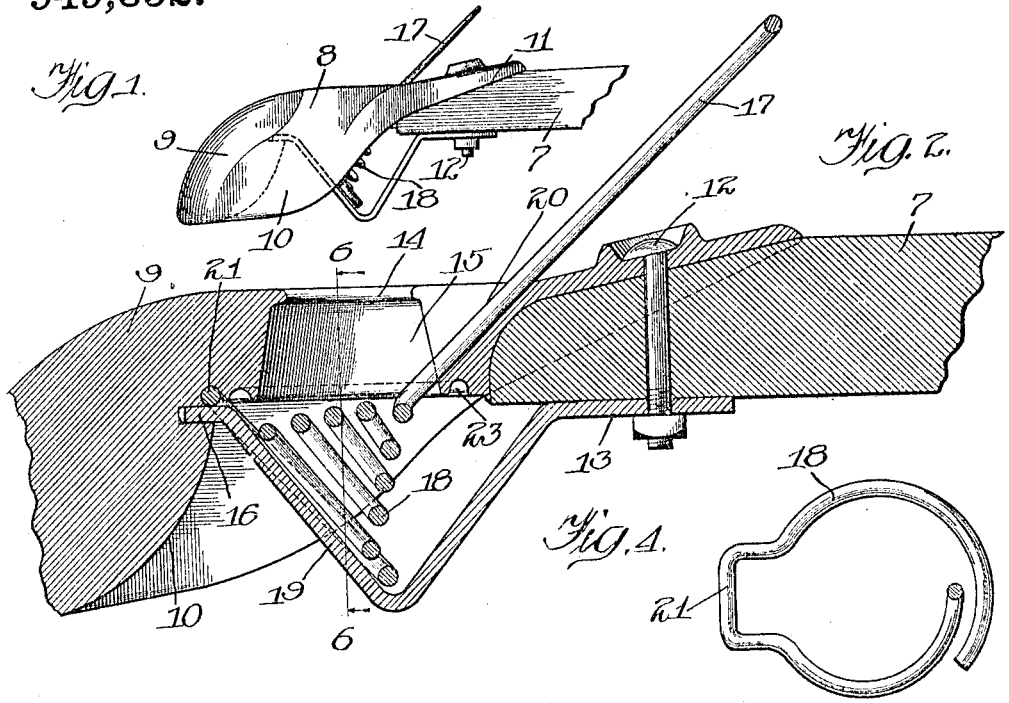
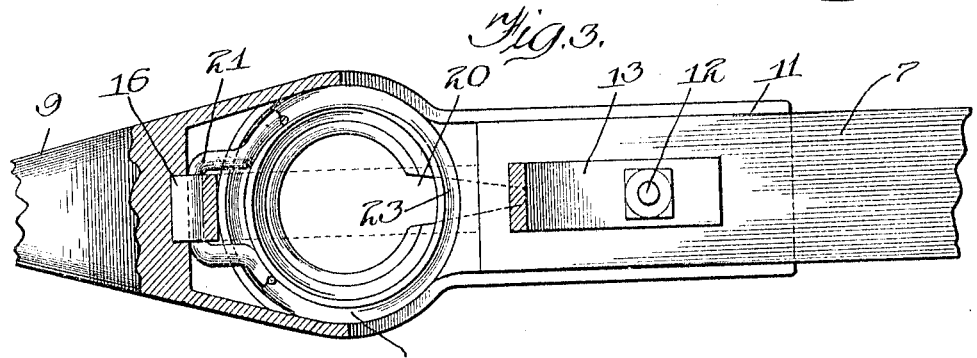
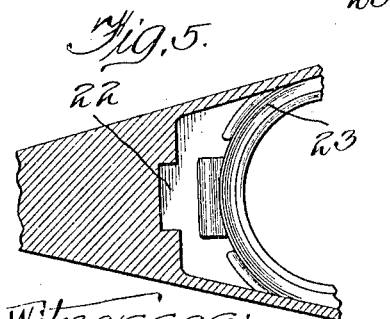
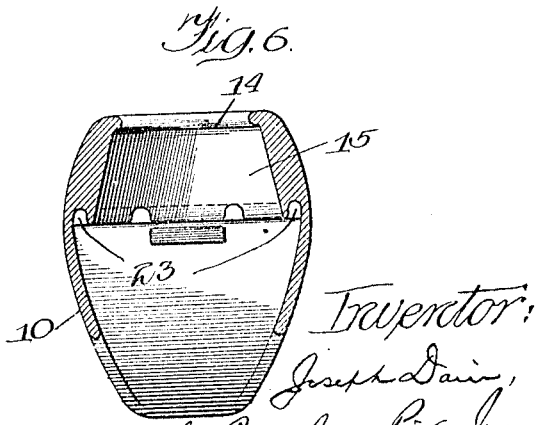
Witnesses:
Inventor:
Joseph Dain,

UNITED STATES PATENT OFFICE.

JOSEPH DAIN, OF OTTUMWA, IOWA.

HAY-RETAINING DEVICE FOR HAY-STACKERS.

949,352.  Specification of Letters Patent.  Patented Feb. 15, 1910.

Application filed March 21, 1907. Serial No. 363,618.

*To all whom it may concern:*

Be it known that I, JOSEPH DAIN, of the city of Ottumwa, in the county of Wapello and State of Iowa, have invented certain new and useful Improvements in Hay-Retaining Devices for Hay-Stackers, of which the following is a specification, reference being had to the accompanying drawings.

My invention relates to hay-stackers, and has particularly to do with retaining-devices designed to be applied to the points of the stacker-teeth for the purpose of retaining upon the stacker-teeth the hay delivered thereto by the rakes.

As is well understood by those familiar with the art, hay delivered upon the stacker-teeth is apt to follow the rake as it is backed off, and usually it is necessary for some one to hold the hay on the stacker-head until the rake has been backed away from under it.

The object of my invention is to provide a new and improved device which will automatically engage the hay deposited upon the stacker-head by the rake and retain it thereon while the rake is backed away, and which will be so constructed that it will not offer undue resistance to the passage of the hay over it as it is delivered to the stacker-head, and also will not damage the retainers or rake should it be driven so far upon the stacker-head as to carry the rake-bar beyond the retaining-devices.

More particularly, it is my object to provide a hay-retaining device which will normally be inclined away from the points of the teeth so as to offer less resistance to the passage of the hay over the retainers, and which will readily move into an upright position under the expansive pressure of the hay as the rake is backed away. As it is necessary to employ a number of hay-retainers on each stacker-head, the combined resistance afforded by a series of retainers spring-retained in an upright position is considerable, and frequently would have a tendency to tear the hay and force it through or between the rake-teeth, particularly if light loads were brought in on the rakes. Furthermore, retainers normally held in upright position are apt to cause injury to stock,—farmers frequently leaving the stackers in the field where animals are pastured. By constructing the retainers so that they are normally inclined away from the points of the stacker-teeth, they not only afford much less resistance to the passage of the hay over them as it is delivered by the rakes, but also are much less apt to injure stock. Furthermore, in delivering the load of hay to the stacker with the rake there is usually a little bit of loose hay right at the rear of the rake-head or load. If the rake were driven on to the stacker-head only so far that this portion of the load was directly over the retainer, if the retainer were of the type held in perpendicular position by spring pressure, it would have a tendency to throw the loose hay back off the stacker-teeth, or, in other words, the tension of the spring-actuated retainers would lift this loose hay and roll it off of the tooth points, and this would be especially true if the retainers were placed a short distance away from the points of the teeth. By employing normally-inclined retainers, however, this objection is avoided, since the retainers are not under any considerable tension at the time the load of hay is being delivered to the stacker-head.

I accomplish the objects of my invention in the manner illustrated in the drawings and as hereinafter described.

What I regard as new is set forth in the claims.

In the accompanying drawings,—Figure 1 is a side view of the outer end of one of the teeth of the hay-stacker, showing my improved tooth point and hay-retainer in normal position; Fig. 2 is an enlarged sectional view of the same, the extreme point of the tooth point being broken away; Fig. 3 is an under-side view of some of the parts shown in Fig. 2; Fig. 4 is a view of the lowermost coil of the spring which forms the base of the retainer proper; Fig. 5 is a partial under-side view of the tooth point proper, some parts being in section; and Fig. 6 is a cross-section of the tooth point proper on line 6—6 of Fig. 2.

Referring to the drawings,—7 indicates one of the stacker-teeth, and 8 the tooth point proper. The tooth point 8 is a casting of malleable iron, or other suitable material, the point of which is solid, as shown at 9 in Fig. 1, and the lower surface of which is convex, as indicated by the dotted lines 10 in Fig. 1, and as shown in full lines in Fig. 2. At its rear end, the tooth point is arranged to fit over the point of the stacker tooth 7, as shown in Figs. 1 and 2, being provided with lateral flanges 11 which overlie the sides of the stacker tooth and serve to hold the tooth point properly in position. A bolt 12 passes through the rear portion of the point, also through the point of the stacker-tooth, which is usually of wood, and through the rear end of a bar 13 secured to the under side of the stacker tooth, as will be hereinafter described.

14 indicates an opening in the tooth point forward of the stacker tooth,—the opening lying above a conical chamber 15, as shown in Fig. 2.

As also shown in Fig. 2, the rear end of the bar 13 fits flatly against the under side of the stacker tooth 7, to which it is secured by the bolt 12, whence it extends forward and is bent to V shape, its forward end being substantially parallel with its rear end, as shown at 16 in Fig. 2,—the portion 16 of said bar extending into a recess provided in the tooth point. Thus said recess holds the forward end of the bar 13 in position, while the bolt 12 holds its rear end fixedly against the stacker tooth. The bar 13 is thereby held rigidly in position, but may be removed simply by loosening the nut on the bolt 12.

17 indicates the retainer proper, which, as shown in Fig. 2, comprises an upright arm or rod having at its lower end a spring coiled in conical form, as shown at 18 in Fig. 2,—the lowermost coil of said spring, when in normal position, resting against the forward inclined portion of the bar 13, as shown at 19 in Fig. 2. Thus the retainer, when in normal position, is inclined to the rear,—the upright rod or arm resting in a suitable recess 20 provided in the casting 9 back of the opening 14. The retainer 17 is arranged to swing bodily forward—i. e. away from the stacker-head—in which case the spring 18 moves up into the chamber 15 to bring the arm of the retainer into upright position under the expansive pressure of the load of hay deposited upon the rake-head; and to insure the proper movement of the retainer under such conditions, it is hinged to the tooth point. This hinging is effected by providing the lowermost coil with an offset portion 21, which fits into a suitable recess 22, as shown in Fig. 5, in the tooth point immediately above the portion 16 of the bar 13. This offset portion also prevents the coiled spring 18 from rotating, and thereby becoming detached by the operation of unscrewing, as might occur. Preferably, the tooth point 9 is provided with an annular groove 23 extending around the lower margin of the chamber 15, as shown in Fig. 2, to receive the lowermost coil of the spring 18 when said spring is in its uppermost or upright position, as also shown in Fig. 3—thus further holding the spring in position. The several coils of the spring 18 are successively less in diameter than the next lowermost coil by an amount equal to the diameter of the wire of which the spring is composed, so that each coil may move down into the coil immediately below it, if necessary, thus giving the spring a greater range of movement than would otherwise be the case. The front portion of the tooth point extends down to the lowermost point of the bar 19 so as to protect said bar and prevent hay from getting under the stacker tooth.

In operation the retaining device is normally in the position shown in Fig. 2, being sharply inclined backward and resting in the groove or V-shaped recess 20 of the tooth point. When in this position, the spring 18 is inactive. When a load of hay is carried over upon the stacker-head by the rake, the retainer may yield under the load, if necessary, in which case the resiliency of the spring 18 becomes effective. As soon as the hay passes beyond the retainer and is released by the rake, its expansive force acts against the retainer, moving it to an upright position, where it remains until the stacker has been elevated to discharge its load. As soon as the retainer is acted upon by the hay, the spring 18 becomes operative, holding the hay yieldingly. Should the rake be driven over upon the stacker far enough to carry the rake-bar beyond the retainers, when the rake was backed off, the retainers would yield, swinging forward sufficiently to allow the rake-bar to pass over them without damage either to the stacker or to the rake. Upon the discharge of the load of hay by the stacker the retainers immediately return to their normal or inclined position under the action of gravity owing to the fact that the pivot or hinge of each of the retainers is forward of the longitudinal axis of the retainer, or of the center of the lowermost coil of the spring. The bar 13 and the tooth point thus form a holder which carries the retaining device and limits its movement when in operation. The retainers may readily be removed by removing the bar 13. The retainers are also capable of lateral movement, particularly when swung forward to a greater or less extent from the point shown in Fig. 2, and may thus yield readily in any direction to avoid breakage if the rake is driven upon the stacker-head diagonally.

It will be understood, of course, that in practice a number of retainers are used on each stacker.

I have described in detail the embodiment of my invention illustrated in the accompanying drawings, but it should be understood that my invention is not restricted to the details of the construction shown and described, except in so far as they are particularly claimed, but includes generically the subject-matter of the broader claims.

That which I claim as my invention, and desire to secure by Letters Patent, is,—

1. A hay-retaining device for stackers, comprising a spring-controlled hay-retaining member, means supporting said hay-retaining member normally in a position inclined away from the point of the stacker tooth, said retaining member being arranged to swing forward into a substantially upright position and to yield forwardly from its upright position.

2. A hay-retaining device for hay-stackers, comprising a retaining member having a spring connection at its lower end with a suitable support and being normally supported in a position inclined away from the point of the stacker tooth, said retaining member being adapted to swing forward into a substantially upright position.

3. A hay-retaining device for stackers, consisting of a holder adapted to be secured to a stacker tooth, and a spring-controlled retaining member movably supported by said holder and normally held in an inclined position and movable forward into a substantially upright position.

4. The combination with a stacker-tooth, of a hay-retaining device comprising a spring-controlled retaining member movably mounted on the stacker-tooth and normally in an inclined position and movable forward into a substantially upright position.

5. A hay-retaining attachment for stacker teeth, consisting of a holder detachably connected with the stacker tooth, and a retaining member pivotally connected with and projecting through the holder and normally held in an inclined position.

6. A hay-retaining device for stackers, comprising a holder adapted to be secured to a stacker tooth, said holder having an inclined support, and a retaining member projecting through the holder and normally resting upon said inclined support and extending rearwardly in an inclined position, said retaining member being adapted to swing forward into an upright position in response to pressure toward the point of the stacker tooth.

7. A hay-retaining device for stackers, comprising a holder adapted to be applied to a stacker tooth, said holder having an inclined support, a retainer having a base adapted to rest on said support, said retainer being normally in an inclined position, said retainer being adapted to swing forward into an upright position in response to pressure toward the point of the stacker tooth, said holder having a recess adapted to receive said retainer base when the retainer moves into its upright position.

8. A hay-retaining device for stackers, comprising a spring-controlled retainer, and means pivotally connecting the retainer at its lower end with the stacker tooth and arranged to permit the retainer normally to occupy an inclined position and to swing toward the point of the stacker tooth into a substantially upright position.

9. A hay-retaining device for stackers, comprising a spring-controlled retainer arm pivotally connected at one side of its axis with the stacker tooth and normally inclined away from the point of the stacker tooth, said retainer arm being adapted to swing forward into a more nearly upright position in response to pressure toward the point of the stacker tooth.

10. A hay-retaining device for stackers, comprising a retainer arm pivotally connected at one side of its axis with the stacker tooth and normally inclined away from the point of the stacker tooth, said retainer arm being adapted to swing forward into a more nearly upright position in response to pressure toward the point of the stacker tooth and to swing forward beyond an upright position in response to extraordinary pressure toward the point of the stacker tooth.

11. A hay-retaining device for stackers, comprising a retainer arm having a conical spring at its lower end, means pivotally connecting one of the outer coils of said spring with the stacker tooth at a point forward of the center thereof whereby said retainer arm normally occupies a position inclined away from the point of the stacker tooth, an inclined support for the base of said spring, and a recess adapted to receive said spring when the retainer is moved to its upright position.

12. A hay-retaining device for stackers, comprising a holder, a retainer arm having a conical spring at its base, said spring being hinged to said holder at a point forward of its center, an inclined support for said spring, and a recess in said holder adapted to receive said spring when the retainer is moved to its upright position.

13. A hay-retaining device for stackers, comprising an arm adapted to yield in any direction, and means supporting said arm normally in a position inclined away from the point of the stacker tooth, said arm being adapted to move into a more nearly upright position in response to pressure toward the point of the stacker tooth.

14. The combination of a stacker tooth, a tooth point therefor, said tooth point having a vertical passage therethrough, a hay-retainer extending through said passage, said retainer being hinged to said tooth point and normally occupying a position inclined away from the point of the stacker tooth, and an inclined support for said retainer.

15. The combination of a stacker tooth, a tooth point therefor, said tooth point having a vertical passage therethrough, a hay-retainer extending through said passage, said retainer being hinged to said tooth point and normally occupying a position inclined away from the point of the stacker tooth, and a V-shaped bar connected with the tooth point and with the stacker tooth and extending under said retainer.

16. The combination of a stacker tooth, a tooth point therefor, said tooth point having a vertical passage therethrough, a hay-retainer extending through said passage, said retainer being hinged to said tooth point and normally occupying a position inclined away from the point of the stacker tooth, and a V-shaped bar connected with the tooth point and with the stacker tooth and extending under said retainer, the lower forward portion of said tooth point extending down in front of said bar.

17. The combination of a stacker tooth, a tooth point therefor, said tooth point having a vertical passage therethrough, a hay-retainer extending through said passage, said retainer being hinged to said tooth point and normally occupying a position inclined away from the point of the stacker tooth.

18. The combination with the teeth of a stacker; of a hollow member secured to each tooth and provided with a slot; a hay-retaining finger pivotally mounted at its inner end within said hollow member and projecting through said slot; and means confined within the hollow member to control said finger.

19. A device of the character described comprising a hollow casting and a tension controlled hay-retaining finger pivotally mounted at one end within the casting.

20. A device of the character described comprising a hollow member, and a finger pivotally mounted in said member and projecting therethrough.

21. A device of the character described comprising a hollow member, a finger pivotally mounted in the member and projecting therethrough, and means within the member to control the finger.

22. A device of the character described comprising a hollow member, a pivoted hay retaining finger, said hollow member having oppositely disposed stops to limit the movement of the finger.

23. A device of the character described comprising a hollow member, a pivoted hay retaining finger, said hollow member having oppositely disposed stops to limit the movement of the finger, and means arranged to control the finger.

JOSEPH DAIN.

Witnesses:
J. D. BROWNING,
W. G. DUFFIELD.